(12) United States Patent
Wang

(10) Patent No.: US 6,278,540 B1
(45) Date of Patent: Aug. 21, 2001

(54) EFFICIENT COLOR FILTERING AND BEAM STEERING BASED ON CONTROLLED TOTAL INTERNAL REFLECTION

(75) Inventor: Yu Wang, La Crescenta, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/277,080

(22) Filed: Mar. 26, 1999

Related U.S. Application Data

(60) Provisional application No. 60/080,498, filed on Apr. 2, 1998.

(51) Int. Cl.[7] .................................................. G02F 1/03
(52) U.S. Cl. .......................... 359/245; 359/263; 359/254; 359/250
(58) Field of Search .................................. 359/263, 254, 359/250, 298, 318, 320, 322, 245, 222, 584–586, 588, 589, 487, 494, 496, 498, 502

(56) References Cited

U.S. PATENT DOCUMENTS

| 5,155,617 | 10/1992 | Solgaard et al. .................. 359/245 |
| 5,398,041 | * 3/1995 | Hyatt ................................... 345/88 |
| 5,432,624 | 7/1995 | Black ................................... 359/53 |
| 5,570,139 | 10/1996 | Wang ................................... 348/744 |
| 5,621,487 | 4/1997 | Shirochi ............................... 349/112 |
| 5,802,223 | 9/1998 | Nashimoto ........................... 385/8 |
| 6,025,899 | * 2/2000 | Fukunaga et al. .................. 349/115 |
| 6,028,649 | * 2/2000 | Faris et al. .......................... 349/10 |
| 6,067,136 | * 7/1998 | Yamaguchi et al. ................ 349/96 |
| 6,097,456 | * 8/2000 | Wang ................................... 349/105 |

FOREIGN PATENT DOCUMENTS 61-212825  9/1986  (JP) .................................. G02F/1/03

\* cited by examiner

*Primary Examiner*—Georgia Epps
*Assistant Examiner*—Timothy Thompson
(74) *Attorney, Agent, or Firm*—Fish & Richardson P.C.

(57) ABSTRACT

Efficient color filtering and beam steering by combining the total internal reflection and the electro-optic effect in a special way.

21 Claims, 5 Drawing Sheets

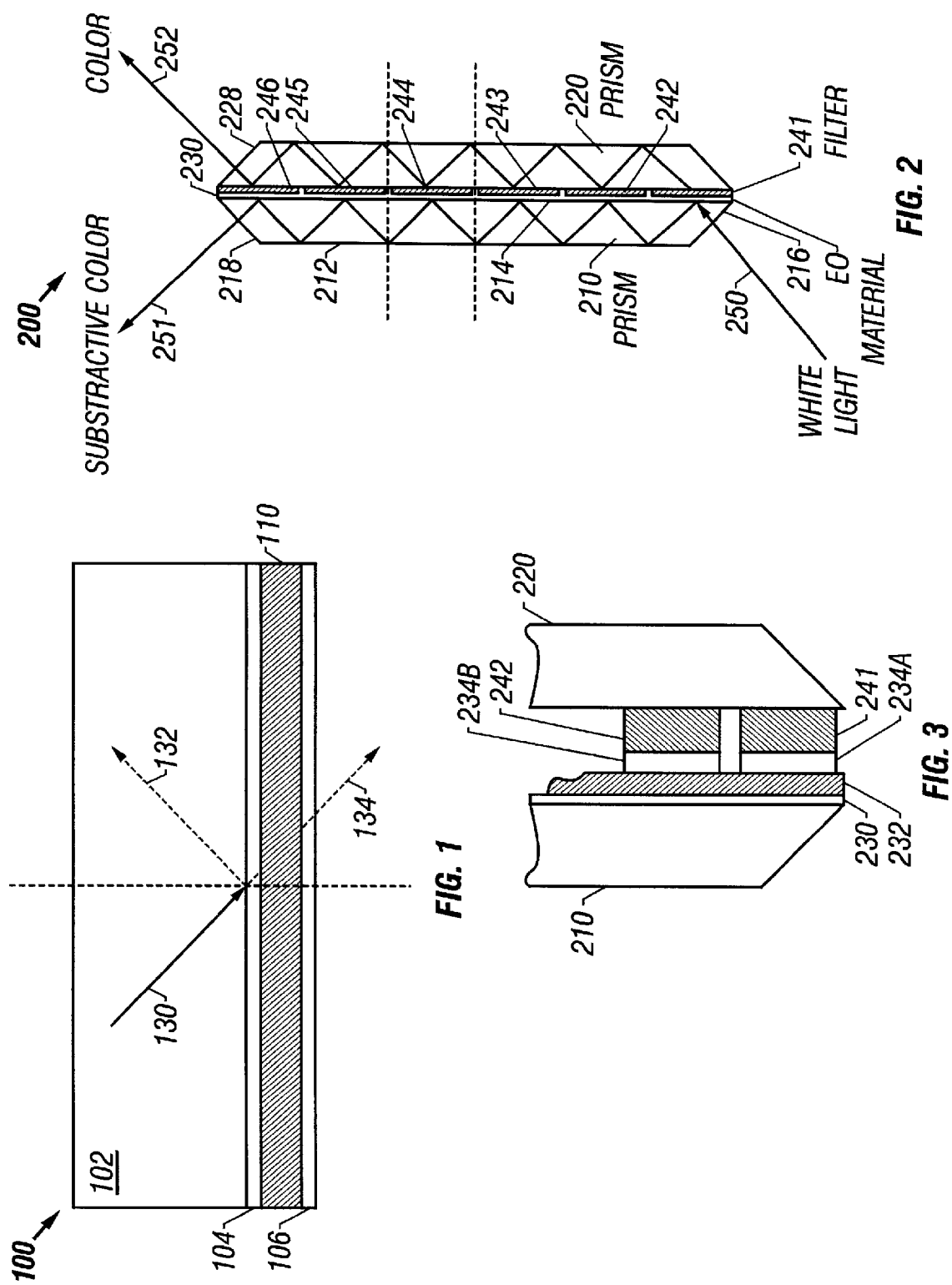

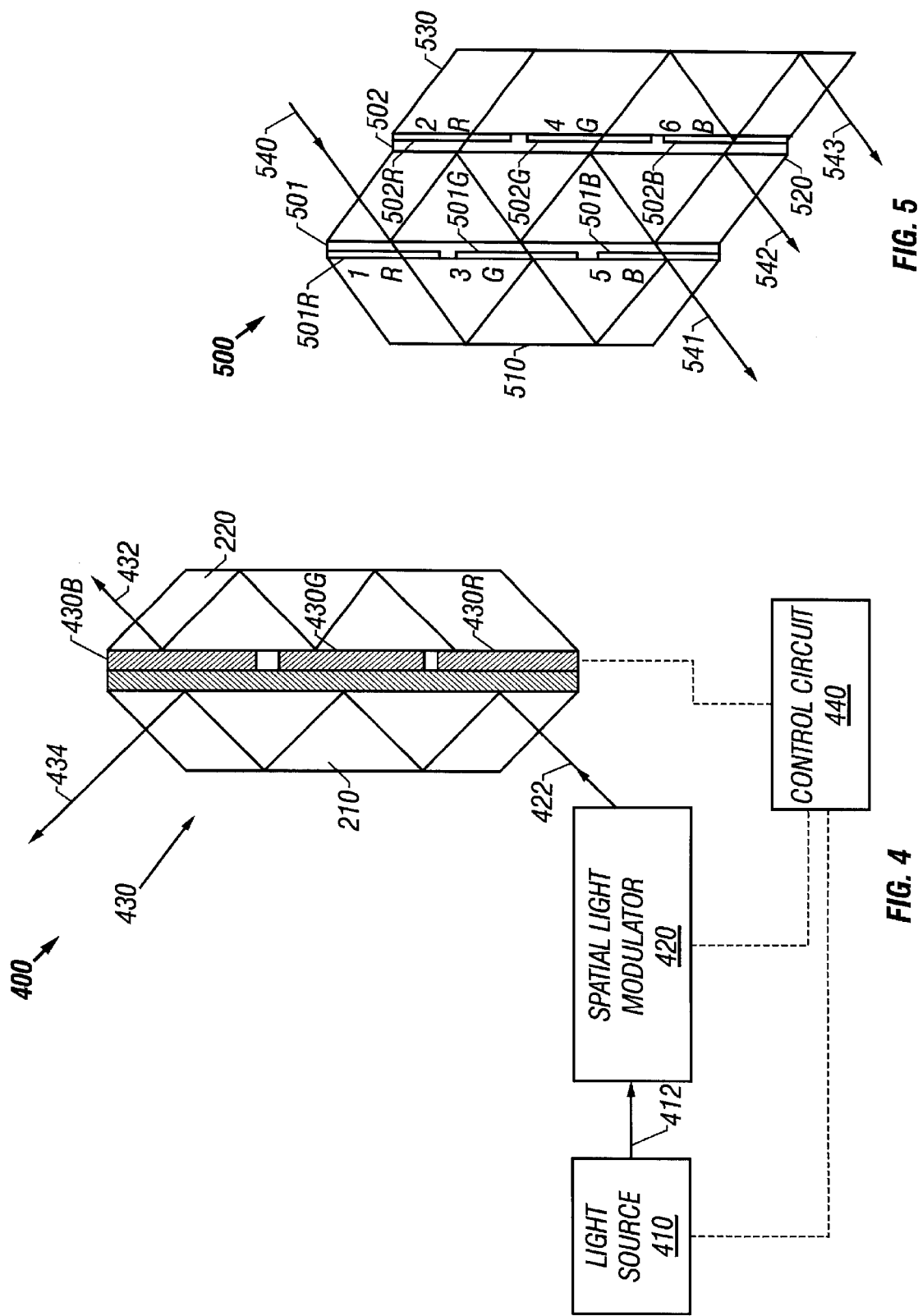

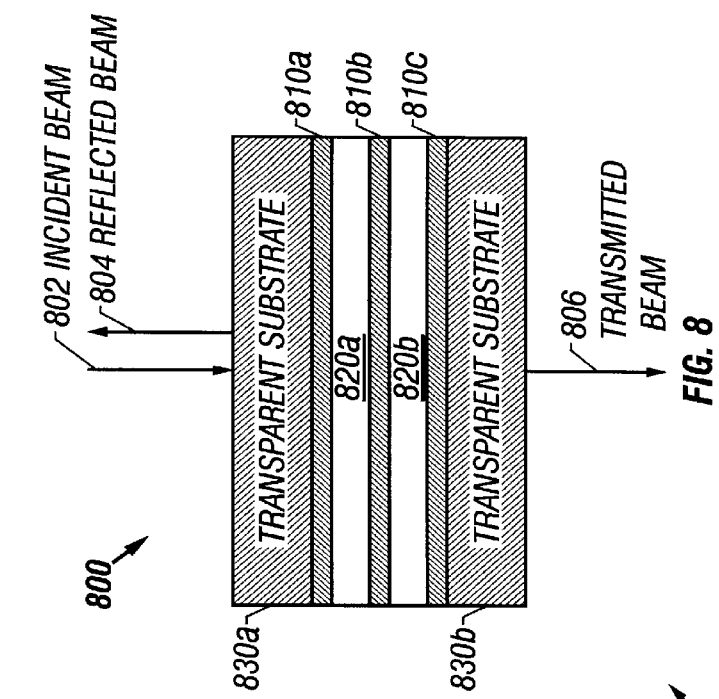
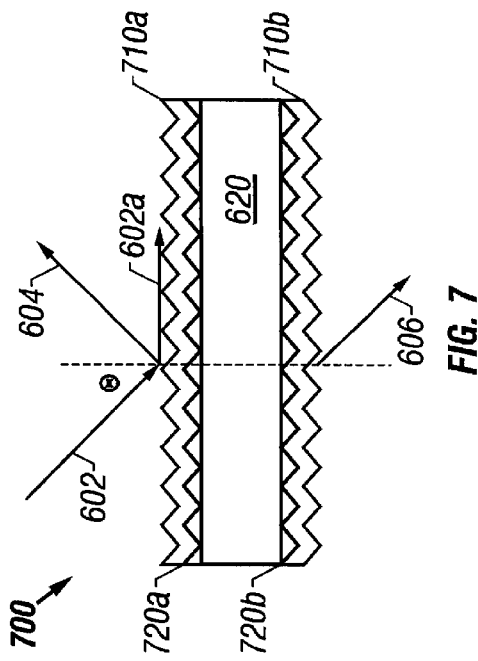
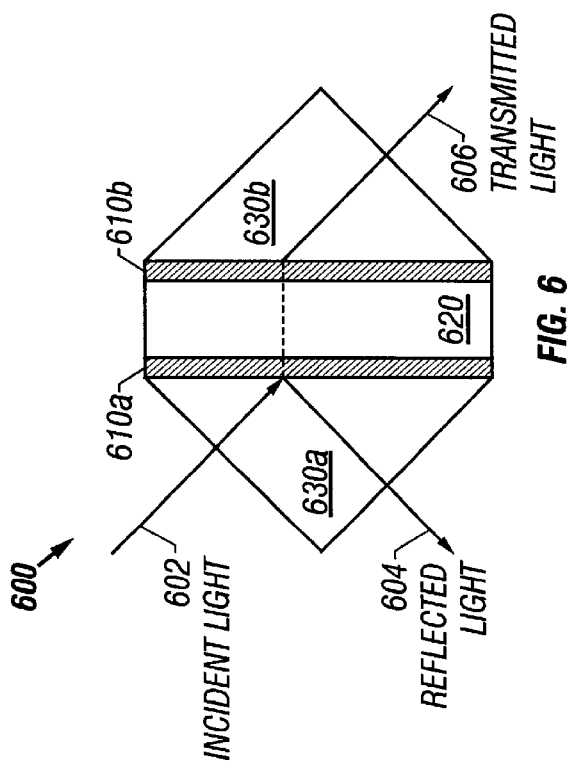

EFFICIENT COLOR FILTERING AND BEAM STEERING BASED ON CONTROLLED TOTAL INTERNAL REFLECTION

This application claims the benefit of the U.S. Provisional Application No. 60/080,498, filed on Apr. 2, 1998.

ORIGIN OF THE INVENTION

The invention described herein was made in the performance of work under a NASA contract, and is subject to the provisions of Public Law 96-517 (35 U.S.C. 202) in which the Contractor has elected to retain title.

TECHNICAL FIELD

The present invention relates to manipulation of an optical beam, and more specifically to optical filtering and beam steering.

BACKGROUND

An optical beam can be manipulated to obtain desired effects for various applications. One type of optical manipulation is color filtering. For example, the spectral composition of a beam can be filtered by using an optical wavelength filter to obtain light of a desired wavelength or within a certain wavelength range. Optical color filters can produce color images in display systems such as liquid crystal displays ("LCDs") in projectors, laptop computers, and camcorders.

Many conventional optical color filters operate based on absorption. Such a filter transmits light of a desired color and absorbs light of other colors. In a color LCD, three different absorbing color filters can be implemented in the three adjacent pixel cells to form one color pixel. Such filters are lossy since only about one third of a white beam is actually used for color display. This low efficiency significantly reduces the image brightness for a given light source.

Color wheels are also absorbing color filters. As the wheel spins, a white beam is intercepted and absorbed by different absorbing materials on the wheel. Thus, different colors can be obtained in the transmitted light. In addition to the above absorption loss of light, a color wheel can also be prone to mechanical failure because of tear and wear of the moving wheel.

Another common type of optical manipulation is beam steering where the direction of an optical beam is steered in a controlled manner. For example, laser vector displays and laser video projectors use beam scanners to scan laser beams at high speeds to form images. One type of beam scanners are based on a mirror or a prism engaged to a moving device such as a galvanometer. Such scanners are relatively slow due to the inertia of the galvanometer and the attached optical element. Wear and tear of the galvanometer associated with the motion of the galvanometer also adversely affect the reliability and durability of such beam scanners.

Therefore, there exists a need for efficient color filters and for reliable beam scanners without moving parts.

SUMMARY

The present disclosure provides a non-absorbing tunable optical color filter and an optical scanner without a moving part based on total internal reflection.

An optical interface between two different transparent dielectric materials is used to effect total internal reflection from a high-index material with a refractive index of $n_H$ to a low-index material with a refractive index of $n_L$. The critical angle, $\theta_C$, for the total internal reflection is a function of $n_L$ when the $n_H$ is a fixed constant: $\theta_C = \sin^{-1}(n_L/n_H)$. Hence, control and adjustment of $n_L$ can be used to control and adjust the condition of the total internal reflection for a beam incident to the interface near a predetermined critical angle.

According to one embodiment, a device operable to change a property of an optical beam may include a first transparent optical element having an optical surface coated with a transparent conducting layer and a layer of electro-optic material formed over the transparent conducting layer. The electro-optic material has a refractive index which is smaller than that of the first optical element when biased at a first voltage and is substantially equal to that of the first optical element when biased at a second voltage.

The device includes a plurality of independent transparent electrodes formed over the electro-optic material to divide the layer of electro-optic material into a plurality of pixels. A control circuit is coupled to bias each electrode relative to the transparent conducting layer between the first and second voltages to either effect total internal reflection on an incident beam in the first transparent optical element or to transmit the incident beam.

The above device may be configured as a tunable color filter by incorporating a non-absorbing filter in each pixel. The filter can be formed over the electrode in each pixel to transmit light of a selected color associated with that pixel and reflect light of other colors.

In addition, the above device may be used to effect an optical scanner to shift the position of an incident beam from one pixel to another by properly controlling the bias voltages on the pixels.

The total internal reflection and the index control based on the electro-optic effect are combined in a special way to provide high-speed optical control without moving parts. In addition, the use of non-absorbing color filters significantly increases efficiency of color filtering over conventional absorbing color wheels and dye filters and provides new color display techniques for many applications including notebook computers.

These and other aspects and advantages of the present invention will become more apparent in light of the following detailed description, the accompanying drawings, and the claims.

BRIEF DESCRIPTION OF THE DRAWINGS

FIG. 1 is a diagram of an electro-optic module that produces a controllable total internal reflection.

FIG. 2 illustrates one embodiment of a tunable color filter based on controllable total internal reflection.

FIG. 3 shows one implementation of a color filtering pixel of the filter shown in FIG. 2.

FIG. 4 shows a color image display system based on a three-pixel color filter based on controllable total internal reflection.

FIG. 5 shows one embodiment of a scrolling color filter based on controllable total internal reflection.

FIG. 6 shows a non-absorbing color filter based on surface plasmon waves at a metal-dielectric interface.

FIG. 7 shows another non-absorbing color filter based on surface plasmon waves.

FIG. 8 shows one example of metal-film interference filter having three layers of thin metal films and two dielectric layers.

DETAILED DESCRIPTION

Figure 9:
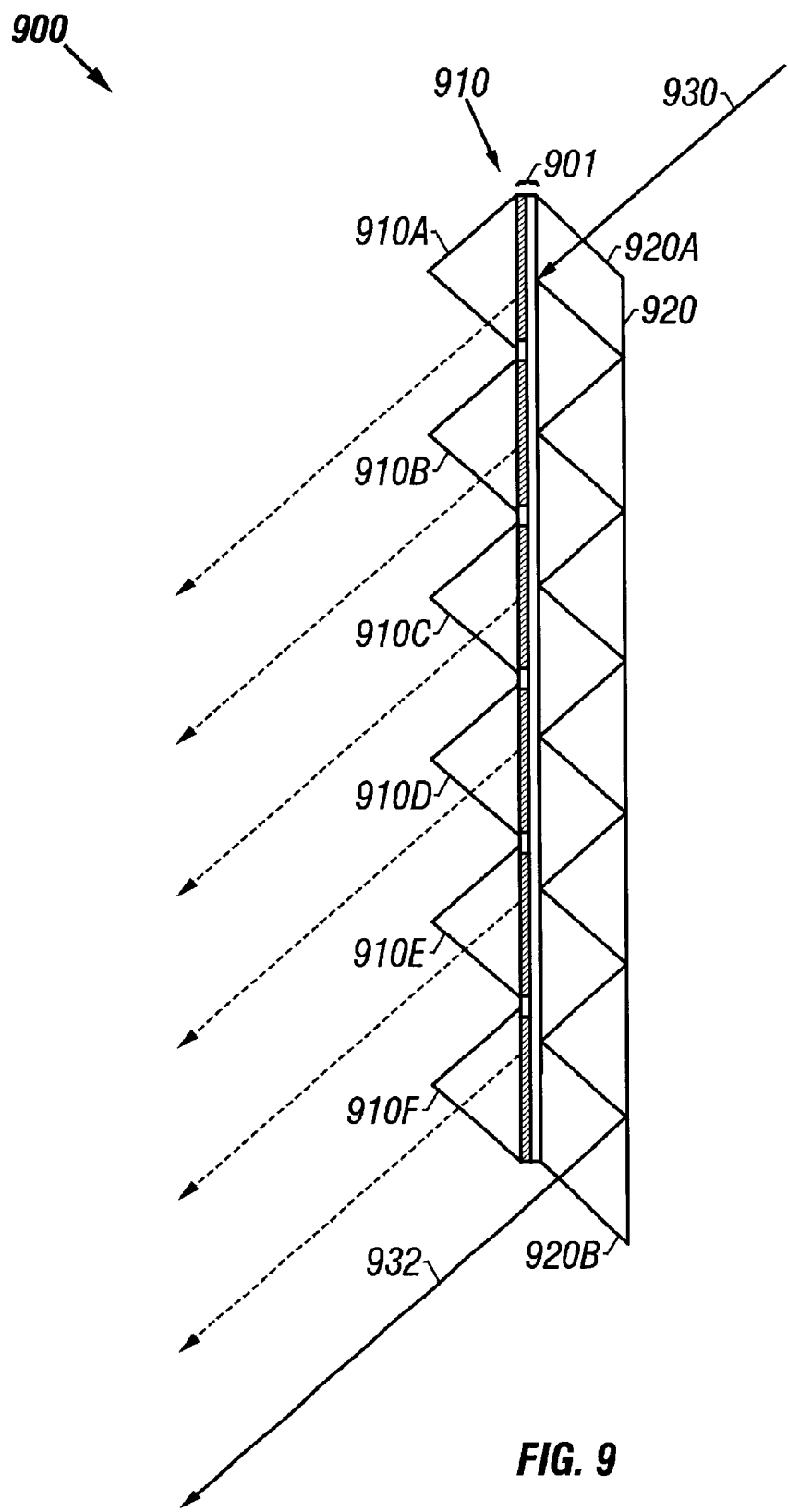
FIG. 9 shows one embodiment of a beam scanner.

The devices and techniques of the present disclosure are based on unique combinations of the electro-optic effect and total internal reflection. FIG. 1 shows an electro-optic module 100 that produces a controllable total internal reflection. An optical transparent medium 102 of a high refractive index ($n_H$) has an optical surface 102A. A first optically-transparent conducting layer 104 is formed over the surface 102A. An electro-optic layer 110 formed of a selected electro-optic material with a low refractive index $n_{EO}$ is deposited over the first conducting layer 104. A second optically-transparent conducting layer 106 is formed over the electro-optic layer 110.

The refractive index $n_{EO}$ of the electro-optic layer 110 can be varied by an external electrical field. An electrical control circuit 120 is connected to the first and second conducting layers 104 and 106 and supplies a control voltage across the EO layer 110 to control the refractive index $n_{EO}$. Assume an optical beam 130 impinges upon the first conducting layer 104 from the medium 102 at an acute incident angle θ. It is further assumed that, when the control voltage is set at a first value $V_1$, $n_{EO}(V_1)$ is less than $n_H$, and $$n_{EO}(V_1) \leq n_H \sin \theta.$$

Under this condition, the incident angle θ is equal to or greater than the critical angle $\theta_C = \sin^{-1}(n_{EO}/n_H)$ for the total internal reflection and thus the beam 130 is entirely reflected back to the medium 102 as a reflected beam 132.

When the control voltage is set to a different value V to change the refractive index of the EO layer 110 to $$n_{EO}(V) > n_H \sin \theta,$$

the incident beam 130 is in general partially reflected as the beam 132 and partially transmits into the EO layer 110 as a transmitted beam 134. Due to the refraction effect, the direction of the transmitted beam 134 deviates from that of the incident beam 130. However, if the control voltage is set at a second value $V_2$ so that $$n_{EO}(V_2) = n_H,$$

then the incident beam 130 completely transmits into the EO layer 110 without reflection.

Therefore, the control circuit 120 can switch the control voltage between the first and second values $V_1$, $V_2$ to either completely reflect the incident beam 130 back to the medium 102 or to completely transmit the incident beam 130 through the EO layer 110. Such switching operation of the electro-optic module 100 can be used as a building block to form special color filters and beam scanners.

FIG. 2 schematically shows one embodiment 200 of a tunable color filter based on the electro-optic module 100 in FIG. 1. Two dove prisms 210 and 220 are engaged to each other to form the color filter 200. A dove prism may be constructed by truncating off the apex portion of a right-angle prism to form a top surface that is parallel to the hypotenuse bottom surface. The first dove prism 210 has a top surface 212, a bottom hypotenuse surface 214, and two side facets 216 and 218 that form an acute angle with respect to the bottom hypotenuse surface 214. The two parallel surfaces 212 and 214 are sufficiently long to allow multiple reflections therebetween when a beam enters the prism 210 from either one of the facets 216 and 218.

The first dove prism 210 has a transparent conducting film 232 formed on the bottom hypotenuse surface 214. A layer of an electro-optic material 230 is then formed over the first transparent conducting film 232. A linear array of transparent conducting film patches (234A, 234B, 234C, etc.) is then formed over the EO layer 230 to divide the hypotenuse surface 214 into pixels. Each pixel is individually controlled by an electrical control voltage to form a switching module as the module 100 shown in FIG. 1. Hence, if all pixels are biased at the first value $V_1$ to be totally reflective for an incident beam 250 entering the facet 216 and the incident angle is grater than the critical angle at the top surface 212, the incident beam 250 will be reflected between top and bottom surfaces 212, 214 and propagate from the facet 216 to the facet 218 as if the beam travels in a waveguide. If any of the pixels is biased to the second value $V_2$ to match the index of the EO layer 230 to the index of the dove prism 210, the beam impinging on that pixel completely transmits through the EO layer 210 and thus exits the dove prism 210.

The color filtering of the color filter 200 is implemented by a linear array of non-absorbing color filters 241, 242, etc. formed on respective transparent conducting film patches 234A, 234B, etc. FIG. 3 shows a more detailed structure of a pixel in the color filter 200. Each non-absorbing color filter is configured to transmit light at a selected different color but reflect light at other colors. The non-absorbing filters are specially designed to minimize light absorption or to limit light absorption below a predetermined low level. The EO layer and the non-absorbing color filter in each pixel of the color filter 200 operate in combination to transmit a selected color associated with that pixel out of the dove prism 210 and reflect other colors back to the dove prism 210. Because the non-absorbing color filters can be designed independent of the electro-optic switching interface formed by the first prism 210 and the EO layer 230, the color filter 200 can be configured to produce color at almost any wavelength with a suitable bandwidth in the visible spectrum.

The bottom hypotenuse surface of the second dove prism 220 is placed over the non-absorbing color filters 241, 242, etc. to receive transmitted color beams from the pixels. The second dove prism 220 may be similar to the first prism dove 210 and guides the transmitted color beams by total internal reflection to an output facet 228.

The color filter 200 can produce many colors by using a white beam as the input beam 250 and by controlling the control voltages on the pixels. If only one pixel is biased to be transmissive, the output beam 252 from the second dove prism 220 is the selected color associated with the transmissive pixel and the output beam 251 from the first dove prism 210 is its complementary color. When two or more pixels are biased to be transmissive, colors of these transmissive pixels are mixed to produce other colors different from the colors of the pixels. Hence, the color filter 210 is tuned by simply changing the bias voltages on the pixels. The output beam 252 can show the white color by making all pixels transmissive or the black color by making all pixels reflective.

The color filter 210 may be specifically configured to produce three primary colors for color displays. Only three pixels may be sufficient. For example, one pixel has a non-absorbing filter that transmits a primary red, another transmits a primary green, and a third pixel transmits a primary blue. The three pixels can be sequentially controlled to respectively produce the red, green, and blue colors. When integrated with a spatial light modulator, such a three-pixel color filter can be used to generate full color images.

FIG. 4 shows one embodiment of a color image display 400 based on a three-pixel color filter 430 as described above. A white light source 410 produces a white beam 412 for illumination. A spatial light modulator 420 with an array of modulation pixels receives and modulates the beam 412 to produce an image-bearing beam 422. The color filter 430 has three red, green, and blue pixels 430R, 430G, and 430B and filters the image-bearing beam 422 in a controlled sequential manner to produce a colored output image beam 432 from the second dove prism 210. The spatial light modulator 420 may be a LCD panel, a digital micro-mirror array from Texas Instrument, or other suitable spatial light modulators.

The display 400 includes a control circuit 440 that are electrically coupled to the light source 410, the spatial light modulator 420, and the color filter 430. The control circuit 440 changes the control voltages on the three pixels 430R, 430G, and 430B sequentially during the display time of each frame to produce the proper colors. Since the colors 610 are sequentially produced, each pixel of the modulator 420 is used as a color pixel. Hence, the number of image pixels of the color image in the output beam 432 is equal to the number of modulator pixels in the modulator 420. As a result, the image resolution is improved by a factor of 3 over a display system that combines three pixel modulator pixels to produce a single color pixel.

The spatial light modulator 420 is placed in the optical path between the light source 410 and the color filter 430. Alternatively, the modulator 420 may be placed in the optical path of the output beam 432 from the second dove prism 220. The output beam 434 from the first dove prism 210 may also be used to display color images.

FIG. 5 schematically shows a scrolling color filter 500 to produce scrolling colors based on the electro-optic module 100 in FIG. 1. The scrolling color filter 500 uses three prisms 510, 520, and 530 to form two electro-optic interface layers 501 and 502. The prism 510 may be a dove prism and the prisms 520 and 530 may be parallelpiped prisms. The first electro-optic layer 501 formed by the prisms 510 and 520 includes three color filter pixels 501R, 501G, and 501B for transmitting red, green, and blue colors, respectively. The second electro-optic layer 502 formed by the prisms 520 and 530 also includes three color filter pixels 502R, 502G, and 502B for transmitting red, green, and blue colors, respectively. The color filter pixels 501R, 501G, and 501B are sequentially formed on a first surface of the prism 520 and the color filter pixels 502R, 502G, and 502B are sequentially formed on a second surface of the prism 520 that is parallel to the first surface.

In operation, an incident beam 540 enters the scrolling color filter 500 from one surface of the center prism 520. When two different color pixels, a first one in the layer 501 and a second one in the layer 502 shifted by one pixel from the first one, are biased to be transmissive at one time while other pixels remain reflective, three output beams 541, 542, and 543 of different colors can be produced from the prisms 510, 520, and 530, respectively. For example, if only pixels 501R and 502G are transmissive, the output beams 541, 542, and 543 are red, blue, and green, respectively. Three different combinations of transmissive pixels are shown in Table I to generate scrolling colors.

TABLE I

| Pixel Pair | Beam 541 | Beam 542 | Beam 543 |
| --- | --- | --- | --- |
| 501R, 502G | Red | Blue | Green |
| 501G, 502B | Green | Red | Blue |
| 501B, 502R | Blue | Green | Red |

A control circuit can be implemented to sequentially turn on the pixel pairs in Table I to produce scrolling colors of red, green, and blue. One application of the scrolling color filter 500 is color filtering in a color display system. For example, the color filter 430 in the display 400 of FIG. 4 can be replaced by this scrolling color filter 500. The scrolling color filter 500 can use nearly all optical powers in all three input colors and hence provide efficient color filtering for portable electronic devices such as notebook computers.

The above non-absorbing color filters may be implemented in a number of different configurations. An interference filter having multiple dielectric layers may be used to form such a non-absorbing color filter. The dielectric layers, e.g., alternating dielectric layers of two different dielectrics each of one quarter wavelength in optical thickness, can be structured in a way that only a selected color transmits through and other colors are reflected. In addition, other configurations may be possible.

A non-absorbing color filter may be formed based on energy coupling of surface plasmon waves in a symmetric metal-dielectric interface. Surface plasmon are oscillations of free electrons caused by resonant absorption of a p-polarized incident optical wave at a metal-dielectric interface when the wavelength and incident angle of the optical wave satisfy a plasmon resonance condition. The metal material in general has a negative dielectric constant and the dielectric material has a positive dielectric constant. The electrical field of the p-polarized component at non-normal incidence induces electric dipoles in a metallic layer that forms one side of a metal-dielectric interface based on the excitation of the free electrons in the metal. The direction of the induced dipoles is perpendicular to the metal-dielectric interface. The radiation of the dipoles generates a surface plasmon wave with a wave vector parallel to the interface. The strength of the surface plasmon wave is maximal at the metal-dielectric interface and decays exponentially on both sides of the interface.

The energy conversion from the incident light to the surface plasmon wave is maximal when the incident angle, wavelength of the incident light, the dielectric constants of the metal and the dielectric materials satisfy a surface plasmon resonance condition. In general, this resonance condition relates to mode matching between the p-polarized incident light and the surface plasmon wave at a metal-dielectric interface and may vary with the specific incident coupling mechanism and the structure of the interfaces (e.g., a single interface or two closed coupled interfaces).

One embodiment of the transmissive surface plasmon filter includes a dielectric layer sandwiched between two metallic layers. This forms two closely spaced symmetrical metal-dielectric interfaces. The optical thickness of the dielectric layer is configured to allow for excitation of surface plasmon waves on both metal-dielectric interfaces by an input optical wave. The dielectric layer may be sufficiently thin (e.g., less or larger than one wavelength but in general on the order of a wavelength) to allow for electromagnetic energy coupling between the two metallic layers. The coupling between the surface plasmon waves produces a reflected wave and a transmitted wave that have mutually complimentary colors.

The surface plasmon resonance frequency is set by adjusting the optical thickness of the dielectric layer. Either the thickness or the index of the refraction of the dielectric layer may be adjusted to change the wavelength (i.e., color) of the transmitted light. Such a surface plasmon filter may be configured to have a large tunable range and bandwidth, a simple structure, and light weight.

FIG. 6 shows one implementation 600 of a surface plasmon filter with two coupled symmetrical metal-dielectric interfaces. A dielectric layer 620 is sandwiched between a two substantially identical metallic layers 610a, 610b to form two closed spaced metal-dielectric interfaces. In general, any dielectric material may be used to form the layer 620, including air and an electro-optic material including inorganic crystals. Two prisms 630a, 630b each have an index of the refraction larger than that of the dielectric layer 620. These prisms are respectively formed over the metallic layers 610a, 610b in order to properly couple an input optical beam 602 to excite surface plasmon waves. The prisms 630a, 630b may be formed of a high-index material, e.g., a high-index glass or $TiO_2$, to couple the input optical wave 602 at a specified incident angle. In general, the incident angle of the input optical wave 602 to the interface of the metallic layer 610a and dielectric layer 620 is larger than the critical angle for total reflection defined the high-index layer 610a (or 610b) and the dielectric layer 620.

The metallic layers 610a and 610b are sufficiently thin so that evanescent electromagnetic waves caused by the incident wave 602 can penetrate therethrough. In general, the thickness of the metallic layers 610a and 610b may be any value. However, the preferred thickness is from about 5 nm to about 150 nm and most preferably from about 10 nm to about 100 nm. A variety of metals may be used for forming the layers 610a and 610b, including but not limited to, Ag, Al, Au, K, and Li.

At the resonance condition, the incident optical wave 602 excites a surface plasmon wave at the interface of the metallic layer 610a and the dielectric layer 620. The oscillating free electrons in the first metallic layer 610a generate an evanescent optical wave at the wavelength of the absorbed resonant photons. The field of the evanescent optical wave penetrates the thin dielectric layer 620 to reach the second metallic-dielectric interface formed by the dielectric layer 620 and the metallic layer 610b. The field of the evanescent optical wave can excite a second surface plasmon wave on the second interface 610b. The second surface plasmon wave is substantially identical to the first surface plasmon wave including the frequency and the plasmon wave vector. The oscillating free electrons in the second metallic layer 610b radiate photons in the same direction and at the same frequency as the absorbed resonant photons at the first metallic layer 610c. The radiated photons exit the second metallic layer 610b as a transmitted wave 606 which is substantially parallel to the input beam 602.

Therefore, for an incident light with a broad spectrum, the filter 600 of FIG. 6 will couple the spectral component that satisfies the surface plasmon resonance condition to the second interface 610b as the transmitted wave 606 and reflects the rest of the input light as the reflected wave 604. In particular, a white input beam may be split into a colored transmitted beam 606 and a reflected beam 604 which is spectrally complimentary to the transmitted beam 606.

For a given incident angle of the input optical wave 602, the optical thickness of the dielectric layer 620 may be adjusted to achieve excitation of the surface plasmon waves at different wavelengths to effect color filtering in both transmitted beam 606 and the reflected beam 604. The optical thickness of the dielectric layer 620 is the product of its index of refraction and the layer thickness. Therefore, the thickness of the dielectric layer 620, or the index of refraction, or both may be varied in order to select different wavelengths for transmission. To change the index of refraction of the layer 620, an electro-optic material such as a liquid crystal layer may be used to form the layer 620 and an external electric field is applied to the metallic layers 610a, 610b to change the index.

FIG. 7 shows another non-absorbing color filter 700 based on surface plasmon coupling. In this embodiment, two gratings 710a, 710b substitute the coupling prisms 630a, 630b in the embodiment 600 of FIG. 6. The two gratings 710a, 710b are substantially identical to each other and are each coated with a layer of metal film (720a and 720b) to form the metal-dielectric interfaces. The gratings 710a and 710b are structured and configured to produce a diffracted order 602b of the incident light 602 to have a wave vector parallel to the metal-dielectric interfaces. For example, the first-order diffraction beam may be used as the beam 602b to excite a surface plasmon wave, where the zero-order diffraction beam is reflected as the beam 604. The coupling between the two symmetric interfaces produces the transmitted beam 606.

A non-absorbing color filter may also be a metal-film interference filter. FIG. 8 shows a 5-layer color metal-film interference filter 800 having three metallic layers 810a, 810b, 810c and two dielectric layers 820a, 820b. Each of the metallic layers 810a, 810b, 810c is preferably formed of such a thin metallic film that it is optically transparent in the visible spectral range from about 800 nm to about 750 nm. For example, thin gold or silver films may be used. In one embodiment, a silver film less than about 40 nm thick can be used. The dielectric layers 820a and 820b are configured to have different thickness values for transmitting different colors and may be formed of such materials like $MgF_2$, $SiO_2$, NaF, or LiF. The thickness of the metallic films 810a, 810b, and 810c may be the same for transmitting different colors. Transparent substrates 830a and 830b (e.g., formed of a glass) are used to protect the multi-layer stack. The color of the transmitted light 806 of an incident white beam 802 is complementary to the color of the reflected beam 804.

In general, as the number of metal layers increases, the sharpness of the transition from a transmission region to an adjacent reflection region increases. However, increasing the number of metal layers also increases the complexity of the filter and its manufacturing cost. Hence, one may select a desired number of metal layers based on the specific requirements of an application. The simplest metal-film interference filter is a 3-layer filter which has a single layer of dielectric layer sandwiched between two metal films.

In addition to non-absorbing color filters, the electro-optic module 100 shown in FIG. 1 may also be used to form unique beam scanners. FIG. 9 shows a beam scanner 900 that spatially shifts a beam by a predetermined amount. A parallelpiped prism 920 provides a waveguide to guide an incident beam 930 from a receiving facet 920A to an output facet 920B. An electro-optic layer 901 is formed on one side of the prism 920 to include a layer of transparent conducting layer, a layer of electro-optic material, and a linear array of electrodes. The linear array of electrodes divides the electro-optic layer 901 into a linear array of pixels. An array 910 of prisms (910A, 910B, etc.) are formed over the electro-optic layer 901 for coupling transmitted beams from the pixels. Alternatively, a layer of transparent material can replace the prism array 910.

In operation, one pixel may be biased to be transmissive at a time so that the beam in the prism 920 can exit that pixel as an output. If all pixels are reflective, the input beam 930 exits the facet 920B as an output beam 932. Hence, the position where the input beam 930 exits the prism 920 can be controlled by controlling the bias voltages on the pixels in a predetermined sequence. For example, the pixels may be sequentially biased to be transmissive to scan the output beam from top to the bottom of the filter 900.

Figure 10:
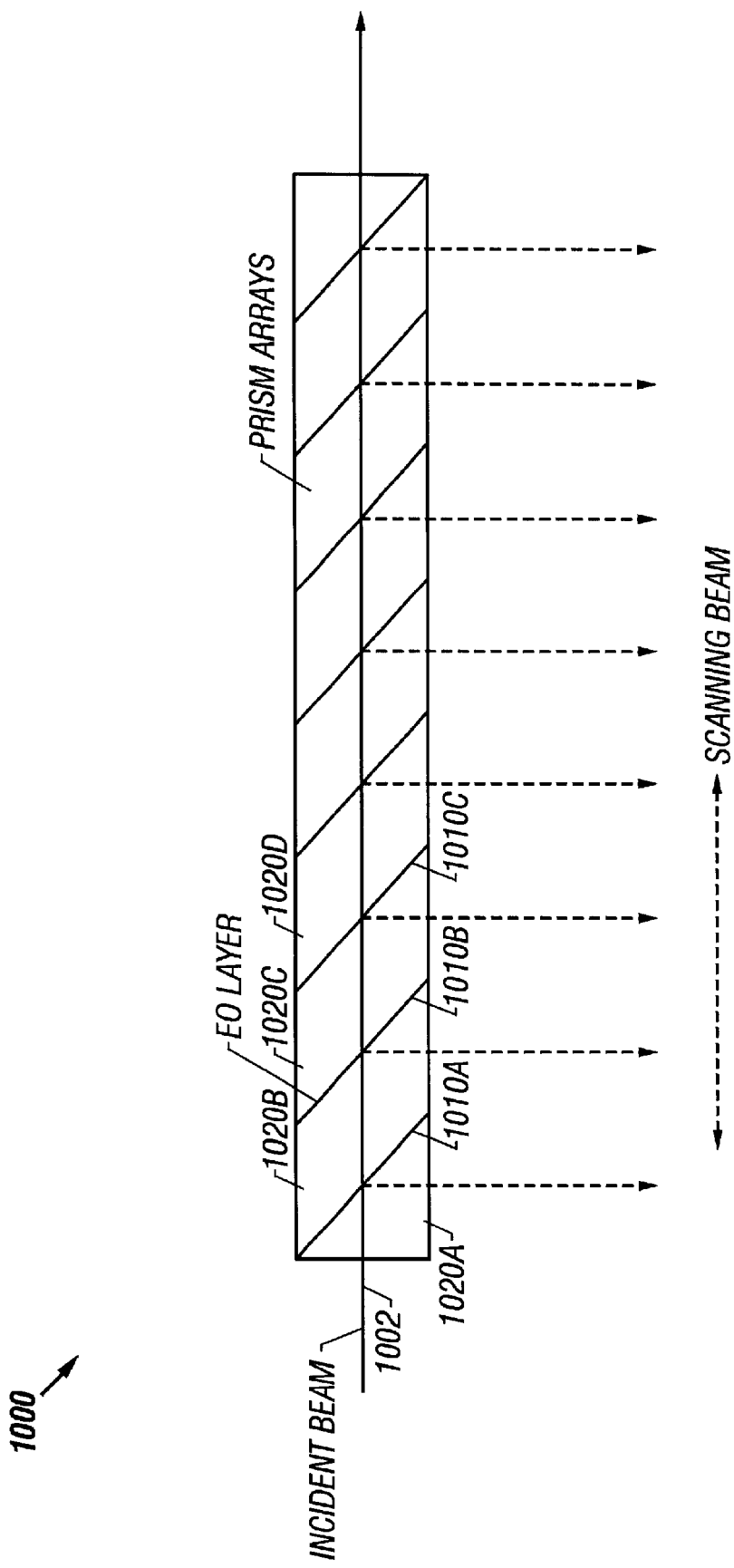
FIG. 10 shows another embodiment of a beam scanner.

FIG. 10 shows another beam scanner 1000 having multiple mutually parallel electro-optic layers 1010A, 1010B, etc. A control circuit is coupled to control individual bias is voltages on the electro-optic layers so that each electro-optic layer may be either transmissive or totally reflective. The beam scanner 1000 may be formed of multiple prisms 1020A, 1020B, etc. that are stacked together. The two prisms on the ends may be right-angle prisms while the middle prisms may be parallelpiped prims. Two adjacent prisms form an electro-optic layer having a layer of electro-optic material sandwiched between two transparent conducting layers. In a beam scanning operation, only one electro-optic layer may be biased to be reflective so as to direct an input beam 1002 out of the optical path going through the electro-optic layers.

Although only a few embodiments are disclosed, various modifications and enhancements may be made without departing from the scope and spirit of the appended claims.

What is claimed is:

1. A device operable to change a property of an optical beam, comprising:

a first transparent optical element of a first refractive index having a first optical surface and a second optical surface that is spaced from and substantially parallel to said first optical surface, said first transparent optical element configured to guide an incident beam between said first and said second optical surfaces by reflecting from a plurality of pixel areas on said second optical surface;

a transparent conducting layer formed on said second optical surface;

a layer of electro-optic material formed over said transparent conducting layer and having a second refractive index which is smaller than said first refractive index when biased at a first state and is substantially equal to said first refractive index when biased at a second state;

a plurality of electrically independent transparent electrodes formed over said electro-optic material to divide said layer of electro-optic material into a plurality of pixels that are respectively located over said pixel areas on said second optical surface of said first optical transparent element; and a control circuit coupled to independently bias each electrode relative to said transparent conducting layer between said first and said second states to reflect said incident beam from a selected pixel area to said first optical surface by total internal reflection in said first transparent optical element when a respective electrode formed over said selected pixel area is biased at said first state and to transmit said incident beam through said second optical surface and said electro-optic material when said respective electrode is biased at said second state, without confining light in said electro-optic material.

2. The device as in claim 1, wherein said first transparent optical element includes a prism.

3. The device as in claim 1, further comprising a second transparent optical element disposed relative to said first transparent optical element to receive a transmitted from said pixels.

4. The device as in claim 1, further comprising a plurality of different color filters respectively formed over said electrodes, each color filter configured to transmit light of a selected color associated with a respective pixel and reflect light of other colors.

5. The device as in claim 4, wherein each color filter comprises an interference filter formed of a plurality of dielectric layers.

6. The device as in claim 4, wherein each color filter comprises an interference filter, including:

a first metallic layer configured to be optically transparent to said incident beam;

a first dielectric layer formed on said first metallic layer; and a second metallic layer formed on said first dielectric layer and configured to be optically transparent to said incident beam.

7. The device as in claim 4, wherein each color filter comprises:

a dielectric layer having a first side and an opposing second side and a first dielectric constant; and first and second metallic films each having a second dielectric constant and respectively formed on said first and second sides of said dielectric layer to form first and second metal-dielectric interfaces which are substantially symmetric with respect to said dielectric layer and respectively support surface plasmon waves, said dielectric layer configured to couple light of said selected color in a p-polarization from said first side of said dielectric layer to said second side.

8. A device for manipulating light, comprising:

a first prism of a first refractive index having a first optical surface coated with a transparent conducting layer;

a plurality of pixels formed over said transparent conducting layer, each pixel including:

a layer of electro-optic material over said transparent conducting layer, having a refractive index which is smaller than said first refractive index when biased at a first voltage and is substantially equal to said first refractive index when biased at a second voltage, a second transparent conducting layer formed over said electro-optic material coupled to receive a bias voltage, and a color filter disposed over said second transparent conducting layer and configured to transmit light of a selected color associated with each pixel and reflect light of other colors;

a control circuit coupled to bias said second transparent conducting layer in each pixel relative to said transparent conducting layer between said first and second voltages to either effect total internal reflection on an incident beam in said first prism or to transmit said incident beam; and a second prism disposed relative to said first prism to receive a transmitted beam from each of said pixels.

9. The device as in claim 8, wherein said color filter in each pixel comprises an interference filter formed of a plurality of dielectric layers.

10. The device as in claim 8, wherein said color filter in each pixel comprises an interference filter, including:

a first metallic layer configured to be optically transparent to said incident beam;

a first dielectric layer formed on said first metallic layer; and a second metallic layer formed on said first dielectric layer and configured to be optically transparent to said incident beam.

11. The device as in claim 8, wherein said color filter in each pixel comprises:
  a dielectric layer having a first side and an opposing second side and a first dielectric constant; and
  first and second metallic films each having a second dielectric constant and respectively formed on said first and second sides of said dielectric layer to form first and second metal-dielectric interfaces which are substantially symmetric with respect to said dielectric layer and respectively support surface plasmon waves, said dielectric layer configured to couple light of said selected color in a p-polarization from said first side of said dielectric layer to said second side.

12. The device as in claim 8, wherein said pixels include a first pixel that has a red color filter to transmit a red color, a second pixel that has a green color filter to transmit a green color, and a third pixel that has a blue color filter to transmit a blue color.

13. The device as in claim 12, further comprising a light source to produce light of a white color and a spatial modulator having an array of modulating pixels to modulate said light, wherein said light modulated by said spatial modulator is coupled to said first prism as said input beam.

14. The device as in claim 12, further comprising a light source to produce a beam of a white color as said input beam and a spatial modulator having an array of modulating pixels disposed to receive and modulate an output beam from one of said first and second prisms.

15. The device as in claim 12, wherein said first prism has a second optical surface substantially parallel to said first optical surface to receive reflected light from said pixels on said first optical surface, further comprising:
  a third transparent conducting layer formed on said second optical surface, and a plurality of secondary pixels formed over said third transparent conducting layer that are structurally similar to said pixels and are coupled to said control circuit to receive bias voltages;
  wherein said secondary pixels on said second optical surface are displaced from said pixels on the first optical surface in a way that a reflected beam from one of said pixels impinges upon a designated secondary pixel which further reflects said reflected beam to another of said pixels adjacent to said one pixel on said first optical surface.

16. An electro-optic device, comprising:
  a first transparent optical element of a first refractive index having a first surface;
  a first transparent conducting layer formed over said first surface;
  a first electro-optic material layer formed over said first transparent conducting layer and having a refractive index which is smaller than said first refractive index when biased at a first voltage and is substantially equal to said first refractive index when biased at a second voltage;
  a second transparent conducting layer formed over said first electro-optic material layer;
  a second transparent optical element of said first refractive index having a second surface and a third opposing surface, disposed relative to said first transparent optical element so that said second surface is parallel to said first surface and receives a transmitted beam from said first transparent optical element;
  a third transparent conducting layer formed over said third surface;
  a second electro-optic material layer of a same material of said first electro-optic material layer formed over said third transparent conducting layer;
  a fourth transparent conducting layer; and
  a control circuit coupled to said first, second, third, and fourth conducting layers to respectively bias each electric-optic material layer between said first and second voltages to either effect total internal reflection on an incident beam in said first transparent optical element or to transmit said incident beam.

17. A method for modifying an optical beam, comprising:
receiving the optical beam by using an optical element having an optical interface which is formed with an array of electro-optic filters to transmit different colors, wherein each electro-optic filter has a transmissive state to transmit a respective selected color and reflect other colors when biased at a first voltage and a reflective state to reflect all colors when biased at a second voltage;
directing the optical beam toward said optical interface in a way to reflect the optical beam on a first side of said optical interface from one electro-optic filter to another when all of said electro-optic filters are biased at said second voltage; and
biasing a desired electro-optic filter at said first voltage to transmit a color associated with said electro-optic filter as a transmitted beam to a second side of said optical interface opposing said first side and to reflect other colors in said optical beam back to said first side as a reflected beam.

18. The method as in claim 17, further comprising modulating one of said optical beam before impinging upon said optical interface, said transmitted beam, and said reflected beam to produce a colored image.

19. A method for scanning an optical beam, comprising:
receiving the optical beam by using an optical element having an optical interface which is formed with an array of electro-optic pixels that transmit light when biased at a first voltage and reflect light when biased at a second voltage;
directing the optical beam toward said optical interface in a way to reflect the optical beam on a first side of said optical interface from one electro-optic pixel to another when all of said electro-optic pixels are biased at said second voltage; and
biasing at least a portion of said electro-optic pixels at said first voltage in a predetermined sequence, one at a time, to transmit the optical beam to a second side of said optical interface opposing said first side.

20. An electro-optic device for scanning an optical beam, comprising:
  a plurality of prisms arranged relative to one another at different positions long an optical path and having a plurality of prism surfaces that are all parallel to one another and are positioned along said optical path, each prism surface forming an angle with respect to said optical path;
  a plurality of electro-optic elements respectively formed on said prism surfaces and positioned in said optical path, wherein each electro-optic element is configured to cause light reflection at each interface of a respective prism and said electro-optic element when biased at a first voltage and light transmission at said each interface along said optical path when biased at a second voltage; and a control circuit, coupled to said electro-optic elements to control respective bias voltages.

21. A device as in claim 20, wherein each electro-optic element comprises:

a first transparent conducting layer formed on an optical surface of a respective prism which has a first refractive index;

a layer of electro-optic material formed over said transparent conducting layer and having a second refractive index which is smaller than said first refractive index when biased at said second voltage and is substantially equal to said first refractive index when biased at said first voltage; and a second transparent conducting layer formed over said electro-optic material, said first and second transparent conducting layers electrically coupled to said control circuit to provide bias to said electro-optic material.

* * * * *